(12) United States Patent
Marissal et al.

(10) Patent No.: US 9,279,023 B2
(45) Date of Patent: Mar. 8, 2016

(54) SLURRY PHASE POLYMERISATION PROCESS

(75) Inventors: Daniel Marissal, Casteau (BE); Benoit Koch, Hannut (BE); Christophe Moineau, Nivelles (BE)

(73) Assignee: INEOS EUROPE AG, Vaud (CH)

( * ) Notice: Subject to any disclaimer, the term of this patent is extended or adjusted under 35 U.S.C. 154(b) by 222 days.

(21) Appl. No.: 14/127,289

(22) PCT Filed: Jun. 21, 2012

(86) PCT No.: PCT/EP2012/062011
§ 371 (c)(1),
(2), (4) Date: Dec. 18, 2013

(87) PCT Pub. No.: WO2012/175632
PCT Pub. Date: Dec. 27, 2012

(65) Prior Publication Data
US 2014/0142260 A1    May 22, 2014

(30) Foreign Application Priority Data

Jun. 24, 2011  (EP) .................................... 11171288

(51) Int. Cl.
| | | |
|---|---|---|
| *C08F 2/00* | (2006.01) | |
| *C08F 4/72* | (2006.01) | |
| *C08F 4/44* | (2006.01) | |
| *C08F 4/22* | (2006.01) | |
| *C08F 110/02* | (2006.01) | |
| *C08F 2/01* | (2006.01) | |
| *C08F 4/10* | (2006.01) | |
| *C08F 4/16* | (2006.01) | |

(52) U.S. Cl.
CPC ... *C08F 4/22* (2013.01); *C08F 2/01* (2013.01); *C08F 4/10* (2013.01); *C08F 4/16* (2013.01); *C08F 110/02* (2013.01)

(58) Field of Classification Search
CPC ............ C08F 110/02; C08F 2/01; C08F 4/16; C08F 4/22; C08F 4/10; C08F 2/14
USPC ......................................... 526/65, 108, 123.1
See application file for complete search history.

(56) References Cited

U.S. PATENT DOCUMENTS

| | | | |
|---|---|---|---|
| 6,174,981 B1 | 1/2001 | Bergmeister et al. | |
| 2007/0208154 A1* | 9/2007 | Stavens .................. | C07C 17/389 526/280 |

FOREIGN PATENT DOCUMENTS

| WO | WO 2010/063444 A1 | 6/2010 |
|---|---|---|
| WO | WO 2010/115614 A1 | 10/2010 |

\* cited by examiner

*Primary Examiner* — William Cheung
(74) *Attorney, Agent, or Firm* — Nixon & Vanderhye P.C.

(57) ABSTRACT

Process for polymerizing ethylene in a reactor system containing one or more reactors in series, having a characteristic such that the average polymerization productivity [kgPE/kgcata] per unit ethylene per hour a1 during operation at any first residence time r1 is less than 1.7 (a2r2−a1r1)/(r2−r1), where a2 is the average polymerization productivity [kgPE/kgcata] per unit ethylene per hour during operation at any second residence time r2 where r2>r1, a2 and r2 being measured either in the same reactor in the case of a single reactor polymerization, or in a reactor subsequent to the reactor in which a1 and r1 are measured in the case where the polymerization takes place in more than one reactor. The specific yield of the reactor system is greater than 0.3 tonnes/m³. Operating the system under the above conditions results in improved productivity/unit ethylene.

18 Claims, 2 Drawing Sheets

Chromium catalyst

Chromium catalyst

Ziegler-Natta catalyst

Metallocene catalyst

SLURRY PHASE POLYMERISATION PROCESS

This application is the U.S. national phase of International Application No. PCT/EP2012/062011, filed 21 Jun. 2012 which designated the U.S. and claims priority to European Patent Application No. 11171288.1, filed 24 Jun. 2011, the entire contents of each of which are hereby incorporated by reference.

The present invention is concerned with olefin polymerisation in slurry phase reactors, and more specifically in multiple reactor systems.

BACKGROUND OF THE INVENTION

Slurry phase polymerisation of olefins is well known wherein an olefin monomer and optionally olefin comonomer are polymerised in the presence of a catalyst in a diluent in which the solid polymer product is suspended and transported.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts.

Typically, in the slurry polymerisation process of polyethylene for example, the slurry in the reactor will comprise the particulate polymer, the hydrocarbon diluent(s), (co) monomer(s), catalyst, chain terminators such as hydrogen and other reactor additives In particular the slurry comprises 20-80 weight percent (based on the total weight of the slurry) of particulate polymer and 80-20 weight percent (based on the total weight of the slurry) of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 2-20, preferably 4-10 weight percent of the slurry.

Slurry polymerisation processes are typically carried out in continuous stirred tank reactors (CSTR) or loop reactors. Loop reactors are of a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of each loop reactor of a multiple reactor system can vary but is typically in the range 10-200 m$^3$, more typically 50-120 m$^3$. The loop reactors employed in the present invention are of this generic type. The slurry is pumped around the relatively smooth path endless loop reaction system at fluid velocities sufficient to maintain the polymer in suspension in the slurry and to maintain acceptable cross-sectional concentration and solids loading gradients. Slurry is withdrawn from the polymerisation reactor containing the polymer together with the reagents and inert hydrocarbons, all of which mainly comprise inert diluent and unreacted monomer. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

Control of the solids concentration in the reactor is important in order to avoid reactor blockage. Our own WO 2006/056761 discloses a polymerisation process in which the Froude number is maintained at or below 20 in order to operate at a relatively high solids concentration without employing high circulation velocities. The solids concentration in the reactor is typically 20-40 wt %.

Solids concentration has also been disclosed to influence the polymer properties in a process utilising two reactors in series. WO 02/29822 discloses a process in which the solids concentration of the first reactor is maintained at between 30 and 60 wt % for a Ziegler-Natta catalyst and between 35 and 60 wt % for a metallocene catalyst. This is claimed to result in improved product properties, as well as increased productivity. Both Ziegler-Natta catalysts (depending on the activator) and metallocene catalysts are known to have a "deactivating profile", which means that polymerisation activity decreases with time.

SUMMARY OF THE INVENTION

We have found that for polymerisations having a certain activity profile, productivity in terms of kg of polymer produced per kg of catalyst can be increased by operating the reactor at a higher rate of polymer production per unit of reactor volume.

Accordingly in a first aspect the present invention provides a slurry process for the polymerisation of ethylene in a reactor system comprising one or more reactors in series, having a characteristic such that the average polymerisation activity (=productivity [kgPE/kgcata] per unit ethylene per hour) a1 during operation at any first residence time of length r1 is less than 1.7 (a2r2−a1r1)/(r2r1), where a2 is the average polymerisation activity (=productivity [kgPE/kgcata] per unit ethylene per hour) during operation at any second residence time of length r2 where r2>r1, a2 and r2 being measured either in the same reactor in the case of a single reactor polymerisation, or in a reactor subsequent to the reactor in which a1 and r1 are measured in the case where the polymerisation takes place in more than one reactor, and wherein the specific yield of the reactor system is greater than 0.3 tonnes/m$^3$, specific yield being the production rate of the final reactor (t/h) in the reactor system divided by the total volume of all the reactors in the reactor system (m$^3$) multiplied by the total residence time in all the reactors in the reactor system (h).

Residence time is defined as the mass of polymer in the reactor divided by the production rate (mass/time) of polymer leaving the reactor, and is effectively the average length of time which a polymer particle spends in the reactor before exiting, and during which polymerisation can take place. The length of the residence time in a polymerisation process can be varied by adjusting the conditions. Thus it is possible to determine the polymerisation productivity for different sets of conditions having different residence times.

Polymerisation productivity per unit ethylene is defined as the mass of polymer produced per mass of catalyst, divided by the ethylene concentration in the reactor. Productivity per unit ethylene per hour is the activity of the catalyst, and is a measure of the rate of polymer production for a given concentration of ethylene. The ratio (a2r2−a1r1)/(r2−r1), where "a" is activity and "r" is residence time, is effectively the ratio of the increase in productivity [kgPE/kgcata] per unit ethylene at two residence times to the difference in length of those two residence times, in other words the rate at which productivity increases with increasing residence time. The present invention applies to systems whose activity profile is such that the initial activity (productivity per hour per unit ethylene) is less than 1.7 times the increase in productivity per unit ethylene for every hour's increase in residence time.

In the case of a reaction carried out in a single reactor, the activity profile of the system is determined by measuring the productivity per unit ethylene at two different residence times and using the above formula. In the case of a reaction carried out in two reactors, the first residence time is that in the first reactor and thus the first productivity per unit ethylene measured is that in the first reactor. The second productivity per unit ethylene $a_2r_2$ is measured in the second reactor and corresponds to the total productivity of the reaction in both reactors; similarly the corresponding second residence time $r_2$ is the sum of the residence times in the two reactors. Thus in this two-reactor case the expression $(a_2r_2-a_1r_1)/(r_2-r_1)$ represents the productivity per unit ethylene of the second reactor divided by the residence time in the second reactor.

As previously stated, the present invention is applicable to reaction systems in which $a_1 < 1.7 (a_2r_2-a_1r_1)/(r_2-r_1)$, where $a_1$, $a_2$, $r_1$ and $r_2$ are as defined above. It is particularly suitable for systems in which $a_1 < 1.3 (a_2r_2-a_1r_1)/(r_2-r_1)$, which may be regarded as more activating, and even more so for systems where $a_1 < (a_2r_2-a_1r_1)/(r_2-r_1)$. This productivity ratio depends largely on the catalyst system used, the catalyst system comprising not only the catalyst itself but also any modifiers which may be added. In the absence of modifiers or other external factors, chromium catalysts generally give a productivity ratio which is less than 1. Ziegler-Natta catalysts typically give a productivity ratio between 1 and 2. Use of metallocene catalysts usually results in a productivity ratio greater than 2.

As previously stated, the ratio $a_1/[1.7(a_2r_2-a_1r_1)/(r_2-r_1)]$ can be altered by the addition of cocatalysts, modifiers, comonomer and hydrogen, all of which can increase or decrease catalyst activity. Such modifiers may be added either to one reactor only, or to one or more reactors in a multiple reactor polymerisation, with the effect being different in each case. Cocatalysts tend to increase activity, and therefore adding a cocatalyst only to the first reactor in a multiple reactor polymerisation typically increases the activity of the first reactor relative to the second. On the other hand, adding cocatalyst to both (or all) reactors can help to balance the activity in the two reactors, thereby reducing the value of the ratio. Therefore cocatalyst may be added either to the first reactor only, or to all reactors, or to reactor(s) other than the first reactor, depending on the desired outcome. The activity in a reactor can also be controlled by adjusting the rate of addition of cocatalyst to the reactor or the cocatalyst concentration in the reactor. In a multiple reactor polymerisation, the ratio between the reactors of the rate of cocatalyst addition or cocatalyst concentration can also be adjusted to control the relative activities and hence the ratio $a_1/[1.7(a_2r_2-a_1r_1)/(r_2-r_1)]$.

Similarly, in the case of a multiple reactor polymerisation, comonomer or hydrogen or other activity modifiers may be added either to one reactor such as the first reactor only or the second reactor only, or to both reactors, and their concentrations and/or rates of addition also controlled, as well as the ratios of these various parameters between different reactors.

Specific yield, defined above as production rate of the reactor (t/h) divided by the volume of the reactor ($m^3$) multiplied by the residence time (h), is a measure of the amount of polymer that can be produced for a given total reactor volume. Preferably it is at least 0.33 tonnes/$m^3$, preferably at least 0.37 tonnes/$m^3$, and more preferably at least 0.4 tonnes/$m^3$. Values of over 0.5 tonnes/$m^3$ are possible. Higher specific yields can be achieved by increasing the number of reactors.

In order to achieve a value above 0.3 tonnes/$m^3$, the specific yield can be increased in a number of ways.

In one embodiment of the invention, the specific yield can be increased by performing the process of the invention in a single reactor in which the solids concentration is at least 50 wt %, preferably at least 52 wt %, more preferably at least 54 wt %, and most preferably at least 55 wt %. Such a high solids concentration can be achieved by using a diluent having a density of 400 kg/$m^3$ or less. The use of a light diluent enables a relatively high solids concentration to be achieved. An example of such a diluent is propane.

In an alternative embodiment, the specific yield can be increased by performing the process of the invention in two or more reactors in series, wherein the solids concentration in each reactor is at least 35 wt % and each reactor comprises 15-70% of the total reactor volume. Preferably there are just two reactors in series, each of which comprises 30-70%, preferably 40-60% of the total reactor volume, and each of which contributes 30-70%, preferably 40-60% of the total production. In this embodiment the specific yield may be at least 0.37 tonnes/$m^3$. Alternatively there may be three reactors in series, each of which comprises 15-70%, preferably 20-60% of the total reactor volume, and each of which contributes 15-70%, preferably 20-60% of the total production. In this embodiment the specific yield may be at least 0.45 tonnes/$m^3$.

In a further embodiment, the specific yield can be increased by starting the polymerisation process with a prepolymerisation in a first reactor followed by polymerisation in at least one main reactor at a solids concentration of at least 44 wt %, wherein the volume of the prepolymerisation reactor is at least 5% of that of the main reactor.

If a prepolymerisation reactor is employed, it is preferred that catalyst productivity in the prepolymerisation reactor is less than 20%, preferably less than 10% and more preferably between 5 and 10% of the catalyst productivity in the final reactor. The specific yield may alternatively be increased by using a a solids concentration in one reactor of at least 48 wt %. Alternative solids concentrations are 50 wt %, preferably at least 52 wt %, more preferably at least 54 wt %, and most preferably at least 55 wt %. Such a high solids concentration can be achieved by using a diluent having a density of 400 kg/$m^3$ or less. The use of a light diluent enables a relatively high solids concentration to be achieved. An example of such a diluent is propane.

A further aspect of the invention comprises the use of propane as a diluent and a solids concentration of at least 48 wt % in a slurry process for the polymerisation of ethylene in a reactor system comprising one or more reactors in series, having an average polymerisation productivity [kgPE/kg-cata] per unit ethylene per hour $a_1$ during operation at any first residence time $r_1$ is less than $1.7(a_2r_2-a_1r_1)/(r_2-r_1)$, where $a_2$ is the average polymerisation productivity [kgPE/kgcata] per unit ethylene per hour during operation at any second residence time $r_2$ where $r_2 > r_1$, $r_2$ and the value $a_2r_2$ being determined either in the same reactor in the case of a single reactor polymerisation, or in a reactor subsequent to the reactor in which $a_1$ and $r_1$ are measured in the case where the polymerisation takes place in more than one reactor, the residence time $r_2$ and value $a_2r_2$ in this latter case corresponding to the total residence time and productivity respectively of both reactors, to obtain a specific yield of the reactor system is greater than 0.3 tonnes/$m^3$, specific yield being the production rate of the final reactor (t/h) in the reactor system divided by the total volume of all the reactors in the reactor system ($m^3$) multiplied by the total residence time in all the reactors in the reactor system (h).

In the above further aspect of the invention, the solids concentration is at least 50 wt %, preferably at least 52 wt %, more preferably at least 54 wt %, and most preferably at least 55 wt %.

In all aspects of the invention, a concentrator may be employed at the outlet of one or more reactors to separate the stream exiting the reactor into a solids-rich stream and a solids-lean stream, the solids-lean stream being recycled to the reactor. This too can increase the specific yield by selectively recycling to the reactor smaller particles having a shorter residence time.

In a preferred embodiment of the invention, which may be applied in all of the cases described above, a slurry containing the polymer is withdrawn from the reactor, or the last reactor if there is more than one reactor, and transferred to a flash tank operating at a pressure of at least 5 bar and at a temperature such that at least 75 mol % of the liquid component of the slurry is withdrawn from the flash tank as a vapour, and then subsequently recondensed at a temperature of between 15° C. and 50° C. without compression. The condensed liquid component may then be recycled back into the polymerisation reaction. To enable vaporisation at a temperature higher than 5 bar it is preferable that the diluent used in the polymerisation is isobutane or propane. If the diluent is propane, the flash tank may operate at a pressure of at least 10 bar and still allow at least 75 mol % of the liquid component of the slurry to be withdrawn from the flash tank as a vapour. The relatively high pressure at which vaporisation can take place when the diluent is isobutane or propane is beneficial because it reduces the risk of ingress of contaminant gases such as oxygen, which may occur when pressure is reduced to lower values to enable vaporisation. Such contamination can adversely affect catalyst productivity.

It is preferred that the catalyst used for the polymerisation is a Ziegler-Natta or more preferably a chromium catalyst.

In one embodiment of the invention, the reactor system comprises two reactors in series, each of which has a relative volume between 30% and 70% of the total volume of the two reactors, and each of which has a production rate between 30% and 70% of the total production rate. In an alternative embodiment, the reactor system comprises two reactors in series, the first of which is a prepolymerisation reactor having a relative volume between 5% and 20% of the total volume of the two reactors. In a third embodiment the reactor system comprises more than two reactors in series, each of which has a relative volume between 15% and 70% of the total volume of the two reactors, and each of which has a production rate between 15% and 70% of the total production rate.

In both aspects of the invention, a "slurry process" is a process in which the reactants are dissolved or suspended in a diluent, in which the polymer is insoluble at the polymerisation temperature. The diluent may be any diluent conventionally used in such polymerisations. In the multiple reactor embodiments of the invention the diluent used is the same in all the reactors. Typical diluents include hydrocarbons having 2 to 12, preferably 3 to 8, carbon atoms per molecule, for example linear alkanes such as propane, n-butane, n-pentane, n-hexane and n-heptane, or branched alkanes such as isobutane, isopentane, isooctane and 2,2,-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Isobutane is a preferred diluent: also particularly preferred is any hydrocarbon diluent having a density below 400 kg/m$^3$, such as propane.

The reactor solids concentration is calculated using a density meter located in a vertical leg of the reactor. For the purposes of the present invention, the solids wt % in the slurry is defined as:

$$1/\rho_{slurry} = (\% \text{ wtsolids}/\rho_{PE}) + (1 - \% \text{ wtsolids})/\rho_{liquid\ phase}$$

where $\rho$ is density.

$\rho_{slurry}$ is directly measured by the density meter, $\rho_{PE}$ is the density of the solid polyethylene and is determined by an analytical method such as a gradient column, and $\rho_{liquid\ phase}$ is defined for the purposes of this invention as the density of the diluent itself under the conditions of temperature and pressure operating in the reactor.

Where the polymer produced is polyethylene and the diluent is an alkane, for example isobutane, the solids concentration in each reactor is typically above 35 wt %, and more preferably above 40 wt %. In certain configurations the solids concentration may be at least 45 wt %, preferably at least 48 wt %, or even at least 50 wt %. As described above, it may optionally be increased to as high as 55 wt % in order to increase the overall specific yield. In multiple reactor systems the solids concentration is usually the same in each reactor, but this is not essential.

Typically, in the slurry polymerisation process of polyethylene, the slurry in each reactor comprises the particulate polymer, the hydrocarbon diluent(s), (co) monomer(s), catalyst, chain terminators such as hydrogen and other reactor additives. In particular the slurry comprises 20-75, preferably 30-70 weight percent based on the total weight of the slurry of particulate polymer and 80-25, preferably 70-30 weight percent based on the total weight of the slurry of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 2-20, preferably 4-10 weight percent of the slurry.

A reactor which is particularly suitable for use in the present invention is a loop reactor: the slurry is pumped around the relatively smooth path endless loop reactor at fluid velocities sufficient to maintain the polymer in suspension in the slurry and also sufficient to maintain acceptable cross-sectional concentration and solids concentration gradients. The pressure employed in the loop, or loops is preferably sufficient to maintain the reaction system 'liquid full' i.e. there is substantially no gas phase. Typical pressures used are between 1-100 bara, preferably between 30 to 50 bara. In ethylene polymerisation the ethylene partial pressure will typically be in the range 0.1 to 5 MPa, preferably from 0.2 to 2 MPa, more particularly from 0.4 to 1.5 MPa. The temperatures selected are such that substantially all of the polymer produced is essentially (i) in a non-tacky and non-agglomerative solid particular form and (ii) insoluble in the diluent. The polymerisation temperature depends on the hydrocarbon diluent chosen and the polymer being produced. In ethylene polymerisation the temperature is generally below 130° C., typically between 50 and 125° C., preferably between 75 and 115° C. For example in ethylene polymerisation in isobutane diluent, the pressure employed in the loop is preferably in the range 30-50 bara, the ethylene partial pressure is preferably in the range 0.2-2 MPa and the polymerisation temperature is in the range 75-115° C. Where there are two or more loops, the reaction conditions may be the same or different in different loops.

In multiple reactor embodiment of the invention, one or more of the reactors may be a loop reactor. The second or any subsequent reactor of the multiple reactor system is preferably also a loop reactor, but may alternatively be any other reactor suitable for the slurry polymerisation of olefins, such as a continuous stirred tank reactor. The multiple reactor system can be used to make monomodal or multimodal polymers.

A preferred embodiment of the invention comprises making a multimodal ethylene polymer, in particular a bimodal ethylene polymer, in which a low molecular weight (LMW) polymer is made in one reactor, and a high molecular weight (HMW) polymer is made in another reactor, the polymers being made in either order and the second polymer being made in the presence of the first. In one embodiment, a low molecular weight (LMW) polymer which is 30-70 wt % and more preferably 40-60 wt % of the total polymer is made in the first reactor, and a high molecular weight (HMW) polymer which is 70-30 wt % and more preferably 60-40 wt % of the total polymer is made in the second reactor. The most preferred range of ratios of the HMW and LMW polymers is 45-55 wt % to 55-45 wt %. Optionally the reactor system may comprise an additional reactor before the first reactor, in which a prepolymer is made.

In an alternative embodiment, the HMW polymer is made in the first reactor and the LMW polymer in the second reactor, preferably in the same ratios as mentioned above. Again an additional reactor for making a prepolymer comprising up to 10 wt % of the total polymer may be employed.

The process according to the invention applies to the manufacture of ethylene homopolymers and copolymers. Ethylene copolymers typically comprise an alpha-olefin in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, hexene-1 and octene-1, and mixtures such as ethylene and butene-1 or ethylene and hexene-1. Butene-1, pentene-1 and hexene-1 are particularly preferred comonomers for ethylene copolymerisation.

The operating conditions can also be such that the monomers (e.g. ethylene, propylene) act as the diluent as is the case in so called bulk polymerisation processes. The slurry concentration limits in volume percent have been found to be able to be applied independently of molecular weight of the diluent and whether the diluent is inert or reactive, liquid or supercritical. Propylene monomer is particularly preferred as the diluent for propylene polymerisation Methods of molecular weight regulation are known in the art. When using Ziegler-Natta, metallocene and other single site catalysts, hydrogen is preferably used, a higher hydrogen pressure resulting in a lower average molecular weight. When using chromium type catalysts, polymerization temperature is preferably used to regulate molecular weight.

The principal determinant of the average particle size of the powder is the residence time in the reactor. The particle size distribution of the powder can be affected by many other factors including the particle size distribution of the catalyst fed to the reactor, the initial and average catalyst activity, the robustness of the catalyst support and susceptibility of the powder to fragment under reaction conditions. Solids separating devices (such as hydrocyclones) can be used on the slurry withdrawn from the reactor to assist in control of the average particle size and the particle size distribution of the powder in the reactor. The average particle size is preferably between 100 and 1500 microns, most preferably between 250 and 1000 microns.

The process according to the invention can be used to produce resins which exhibit specific density in the range 890 to 930 kg/m$^3$ (low density), 930 to 940 kg/m$^3$ (medium density) or 940 to 970 kg/m$^3$ (high density).

The process according to the invention is relevant to all olefin polymerisation catalyst systems, particularly those chosen from the Ziegler-type catalysts, in particular those derived from titanium, zirconium or vanadium and from thermally activated silica or inorganic supported chromium oxide catalysts and from metallocene-type catalysts, metallocene being a cyclopentadienyl derivative of a transition metal, in particular of titanium or zirconium.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Non-limiting examples of metallocene-type catalysts may be mono or his (cyclopentadienyl) complexes of group IVB metal, examples of which may be found in EP 129368A, EP 206794A, EP 416815A and EP 420436A.

The above metallocene complexes are utilised for polymerization in the presence of a cocatalyst or activator. Typically activators are aluminoxanes, in particular methyl aluminoxane or alternatively may be compounds based on boron compounds.

Examples of the latter are borates such as trialkyl-substituted ammonium tetraphenyl- or tetrafluorophenyl-borates or triarylboranes such as tris(pentafluorophenyl) borane. Catalyst systems incorporating borate activators are described in EP 561479A, EP 418044A and EP 551277A.

Particular examples of Ziegler-type catalysts include at least one transition metal chosen from groups IIIB, IVB, VB and VIB, magnesium and at least one halogen. Good results are obtained with those comprising:

from 10 to 30% by weight of transition metal, preferably from 15 to 20% by weight, from 20 to 60% by weight of halogen, preferably from 30 to 50% by weight from 0.5 to 20% by weight of magnesium, usually from 1 to 10% by weight, from 0.1 to 10% by weight of aluminium, generally from 0.5 to 5% by weight, the balance generally consists of elements arising from the products used for their manufacture, such as carbon, hydrogen and oxygen. The transition metal and the halogen are preferably titanium and chlorine.

Polymerisations, particularly Ziegler catalysed ones, are typically carried out in the presence of a cocatalyst. It is possible to use any cocatalyst known in the art, especially compounds comprising at least one aluminium-carbon chemical bond, such as optionally halogenated organoaluminium compounds, which can comprise oxygen or an element from group I of the periodic table, and aluminoxanes. Particular examples would be organoaluminium compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. Organoaluminium compounds, especially those which are not halogenated, are well suited. Triethylaluminium and triisobutylaluminium are especially advantageous.

The chromium-based catalyst is preferred to comprise a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 $m^2/g$, preferably from 400 to 550 $m^2/g$ and a volume porosity of greater than 2 cc/g preferably from 2 to 3 cc/g.

Silica supported chromium catalysts are typically subjected to an initial activation step in air at an elevated activation temperature. The activation temperature preferably ranges from 500 to 850° C., more typically 600 to 750° C.

In the case of series reactors, a first reactor of the series is supplied with catalyst and the cocatalyst in addition to the diluent and monomer, and each subsequent reactor is supplied with, at least, monomer, in particular ethylene and with the slurry arising from a preceding reactor of the series, this mixture comprising the catalyst, the cocatalyst and a mixture of the polymers produced in a preceding reactor of the series. It is optionally possible to supply a second reactor and/or, if appropriate, at least one of the following reactors with fresh catalyst and/or cocatalyst.

BRIEF DESCRIPTION OF THE DRAWINGS

The invention is further described with reference to the accompanying drawings, in which.

EXAMPLES

Production data collected from ethylene polymerisation reactions in slurry was used to model the effect of changing certain parameters such as solids concentration, diluent or number of reactors on the specific yield and overall productivity/unit ethylene. The various process features are shown in Table 1 below.

Figure 1:
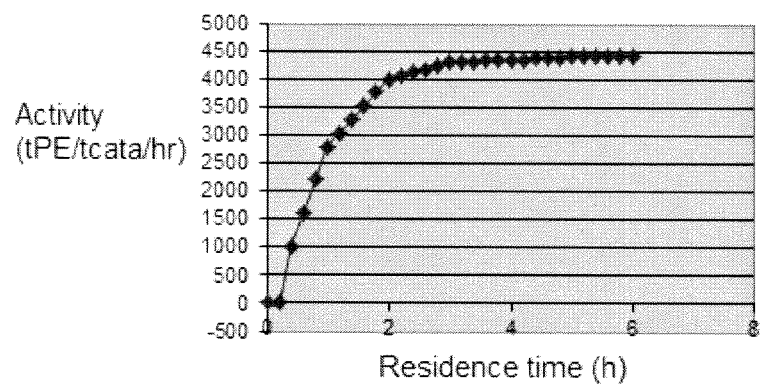
FIG. 1 is an example of an activity profile (kg polyethylene/kg catalyst over time) for a polymerization reaction employing a chromium catalyst containing 1 wt % chromium on a silica support.
Figure 2:
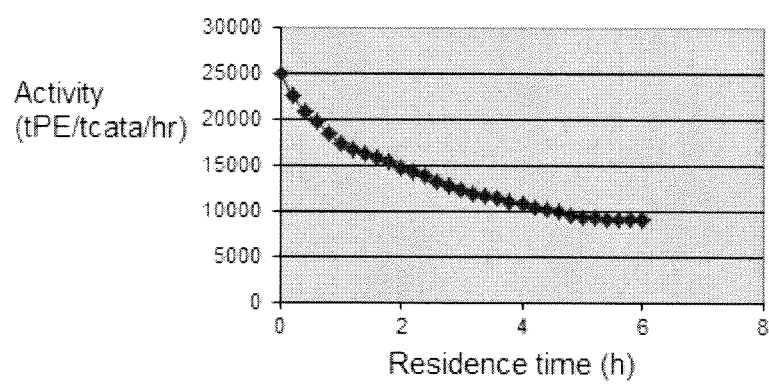
FIG. 2 is an example of an activity profile for a polymerization reaction employing a Ziegler-Natta catalyst containing titanium chloride supported on a magnesium chloride support.
Figure 3:
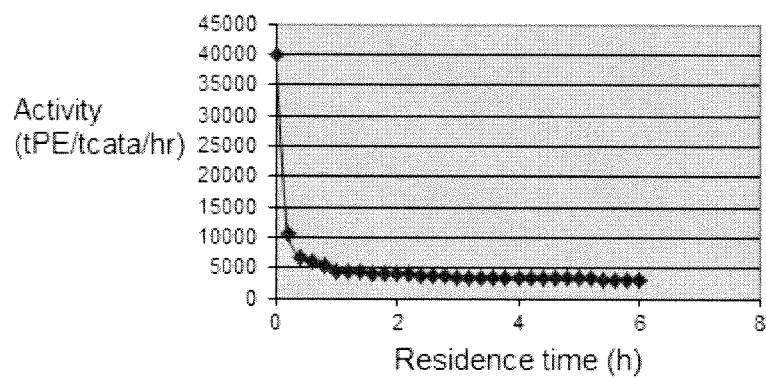
FIG. 3 is an example of an activity profile for a polymerization reaction employing a mono-cyclopentadienyl metallocene catalyst.

The polymerisation reactions on which the calculations for the Examples in Table 1 are based employed a chromium catalyst containing 1 wt % chromium on a silica support. An example of the activity profile (kg polyethylene/kg catalyst over time) is shown in FIG. 1. The reactions used for the calculations of Table 2 used a Ziegler-Natta catalyst containing titanium chloride supported on a magnesium chloride support, an example of whose activity profile is also shown in FIG. 2. The reactions used for the calculations of Table 3 used a mono-cyclopentadienyl metallocene catalyst, an example of whose activity profile is shown in FIG. 3. The activity profiles shown in FIGS. 1-3 were used as the basis for the calculations in the Tables below.

In Table 1, Example A1 may be regarded as a reference Example employing a single 200 $m^3$ reactor at a production rate of 40 tonnes/hr and a solids concentration of 45 wt %. Examples A2 and A3 have the same total reactor volume of 200 $m^3$, as well as the same solids concentration of 45 wt %: however they employ 2 and 3 reactors respectively. In Example A4 a small prepolymerisation reactor is employed before the single main reactor. Examples A5 and A6 both employ propane diluent at a higher solids concentration (55 wt %), but with different production rates.

TABLE 1

| | | chromium catalyst | | | | | | | |
|---|---|---|---|---|---|---|---|---|---|
| | | EXAMPLES | | | | | | | |
| | | A1 | A2 | A3 | A4 | A5 | A6 | A7 | A8 |
| Catalyst | | Cr | Cr | Cr | Cr | Cr | Cr | Cr* | Cr** |
| Number of reactors | | 1 | 2 | 3 | 2 | 1 | 1 | 2 | 2 |
| Diluent | | isob | isob | isob | isob | prop | prop | isob | isob |
| Total reactor volume | $m^3$ | 200 | 200 | 200 | 200 | 200 | 200 | 200 | 200 |
| Vol R1 | $M^3$ | 200 | 100 | 67 | 5 | 200 | 200 | 100 | 100 |
| Vol R2 | $M^3$ | — | 100 | 67 | 195 | — | — | 100 | 100 |
| Vol R3 | $M^3$ | — | — | 67 | — | — | — | — | — |
| Total production rate | t/hr | 40 | 40 | 40 | 40 | 40 | 30 | 40 | 40 |
| Total space time yield | t/hr · $m^3$ | 0.20 | 0.20 | 0.20 | 0.20 | 0.20 | 0.15 | 0.20 | 0.20 |
| Solids concentration | wt % | 45 | 45 | 45 | 45 | 55 | 55 | 45 | 45 |
| Total residence time | Hr | 1.35 | 2.03 | 2.48 | 1.65 | 1.73 | 2.31 | 1.71 | 1.90 |
| Residence time in R1 | Hr | 1.35 | 1.35 | 1.36 | 0.34 | 1.73 | 2.31 | 1.04 | 1.23 |
| Residence time in R2 | Hr | — | 0.68 | 0.56 | 1.32 | — | — | 0.68 | 0.68 |
| Residence time in R3 | Hr | — | — | 0.45 | — | — | — | — | — |
| Ethylene concentration in R1 | Mol % | 6 | 6 | 6 | 6 | 6 | 6 | 3 | 6 |
| Ethylene concentration in R2 | Mol % | — | 6 | 6 | 6 | — | — | 8 | 8 |
| Ethylene concentration in R3 | Mol % | — | — | 6 | — | — | — | — | — |
| Proportion of total prodn in R1 | % | 100 | 50 | 33 | 10 | 100 | 100 | 65 | 55 |
| Proportion of total prodn in R2 | % | — | 50 | 34 | 90 | — | — | 35 | 45 |
| Proportion of total prodn in R3 | % | — | — | 33 | — | — | — | — | — |
| Specific yield | t/$m^3$ | 0.27 | 0.41 | 0.50 | 0.33 | 0.35 | 0.35 | 0.34 | 0.38 |
| Ratio a1/[(a2r2 − a1r1)/(r2 − r1)] | | Ref | 0.5 | 0.5 | 0.4 | ref | 0.7 | 3.2 | 0.9 |

TABLE 1-continued

| | | chromium catalyst | | | | | | | |
|---|---|---|---|---|---|---|---|---|---|
| | | EXAMPLES | | | | | | | |
| | | A1 | A2 | A3 | A4 | A5 | A6 | A7 | A8 |
| Productivity/unit ethylene in R1 | g/g/mol % | 533 | 475 | 385 | 79 | 567 | 833 | 1733 | 1100 |
| Productivity/unit ethylene in $R_{final}$ | g/g/mol % | — | 475 | 385 | 713 | — | — | 350 | 675 |
| Total productivity (polymer/cata) | g/g | 3200 | 5700 | 7000 | 4750 | 3400 | 5000 | 8000 | 12000 |

Cr* - assumes 0.5-10 ppmwt of triethylboron (TEB) cocatalyst added to first reactor R1 only
Cr** - assumes 0.5-10 ppmwt of triethylboron (TEB) cocatalyst added in total to both reactors, split between the reactors in a ratio of 20:80-80:20

In the table above, the ratio a1/[(a2r2−a1r1)/(r2−r1)] is calculated for Examples A2, A3 and A4 by comparison with Example A1. Example A6 is compared with A5 and A8 with A7. Considering the single reactor Examples A5 and A6, A5 may be considered to be the Example at a first residence time r1, and A6 is the Example at a second longer residence time r2. For all the multiple reactor Examples, r2 is equal to the total residence time. The value a1 for the average polymerisation activity (=productivity [kgPE/kgcata] per unit ethylene per hour) is productivity/unit ethylene divided by residence time for Example A5, ie 567/1.73=327.7. r2−r1 is the difference in the residence times between Examples A5 and A6, ie 2.31−1.73=0.58. a1r1 is 327.7×1.73 ie 567, the productivity/unit ethylene, and by analogy a2r2 is 833. Thus the ratio a1/[(a2r2−a1r1)/(r2−r1)] is 327.7/[(833−567)/0.58]=0.7.

For the two reactor Example the calculation is simpler as previously explained, the expression (a2r2−a1r1)/(r2−r1) represents the productivity per unit ethylene of the second reactor divided by the residence time in the second reactor. Thus considering Example A2 for instance, a1 is productivity/unit ethylene divided by residence time for the first reactor of Example A2, ie 475/1.35. (a2r2−a1r1) is the productivity/unit ethylene of the second reactor of Example A2, ie 475, and r2−r1 is the residence time in the second reactor of Example A2, ie 0.68. Thus the ratio a1/[(a2r2−a1r1)/(r2−r1)] is [475/1.35]/[475/0.68]=0.5.

The results show the benefit of operating with the parameters of the invention. For instances Examples A1-A4 all operate a reactor system with a total reactor volume of 200 m³, using isobutane diluent and the same chromium catalyst and operating at the same polymer production rate of 40 tonnes/hr. The "control" run, Example A1, has a specific yield of 0.27 (outside the invention) and an overall productivity of 3200 g/g/. The two reactor equivalent, Example A2, has a specific yield of 0.41 and an overall productivity/unit ethylene of 5700 g/g, whilst the three reactor equivalent, Example A3, has a specific yield of 0.50 and an overall productivity/unit ethylene of 17000 g/g. Thus it can be seen that by increasing the specific yield, in this case by using additional reactors, the productivity can be increased substantially. Example A4 uses a prepolymerisation reactor comprising just 2.5% of the total reactor volume in conjunction with the main reactor. This has a specific yield of 0.33, and also results in an increased productivity/unit ethylene of 4750 g/g.

Examples A5 and A6 show operation in a single reactor at very high solids content using propane diluent, which is a lighter diluent than isobutane. As explained above, comparison of Examples A5 and A6, which use different residence times, enables the ratio a1/[(a2r2−a1r1)/(r2−r1)] to be determined. The higher solids content compared with Example A1 enables a specific yield above 0.3 to be obtained, and consequently a higher productivity is obtained compared with Example A1.

Examples A7 and A8 show the effect of adding triethylboron cocatalyst. The addition of TEB to a chromium-catalysed ethylene polymerisation is known to increase productivity. However if TEB is added only to the first reactor, the difference in productivity per unit ethylene between reactor 1 and reactor 2 is very high, and the overall activity profile is highly deactivating and outside the scope of the invention. However if the same amount of TEB is instead split equally between the two reactors, the productivity per unit ethylene in the two reactors is much more similar, resulting in a much less deactivating profile. The total productivity is significantly increased.

In Table 2 below, Examples A1 to A4 are replicated but based on data obtained using a Ziegler-Natta catalyst.

TABLE 2

| | | Ziegler-Natta | | | | | |
|---|---|---|---|---|---|---|---|
| | | EXAMPLES | | | | | |
| | | B1 | B2 | B3 | B4 | B5 | B6 |
| Catalyst | | ZN* | ZN* | ZN* | ZN* | ZN* | ZN** |
| Number of reactors | | 1 | 2 | 3 | 2 | 2 | 2 |
| Diluent | | isob | isob | isob | isob | isob | isob |
| Total reactor volume | m³ | 200 | 200 | 200 | 200 | 200 | 200 |
| Vol R1 | m³ | 200 | 100 | 67 | 5 | 100 | 100 |
| Vol R2 | m³ | — | 100 | 67 | 195 | 100 | 100 |
| Vol R3 | m³ | — | — | 67 | — | — | — |
| Total production rate | t/hr | 40 | 40 | 40 | 40 | 40 | 40 |
| Total space time yield | t/hr·m³ | 0.20 | 0.20 | 020 | 0.20 | 0.20 | 0.20 |
| Solids concentration | wt % | 45 | 45 | 45 | 45 | 45 | 45 |
| Total residence time | hr | 1.35 | 1.90 | 2.22 | 1.65 | 1.70 | 2.03 |
| Residence time in R1 | hr | 1.35 | 1.23 | 1.12 | 0.34 | 1.02 | 1.35 |
| Residence time in R2 | hr | — | 0.68 | 0.64 | 1.32 | 0.68 | 0.68 |
| Residence time in R3 | hr | — | — | 0.45 | — | — | — |

TABLE 2-continued

| | | Ziegler-Natta | | | | | |
|---|---|---|---|---|---|---|---|
| | | EXAMPLES | | | | | |
| | | B1 | B2 | B3 | B4 | B5 | B6 |
| Ethylene concentration in R1 | mol % | 5 | 3 | 3 | 2 | 2.2 | 2.5 |
| Ethylene concentration in R2 | mol % | | 6 | 4 | 5 | 4.1 | 4.5 |
| Ethylene concentration in R3 | mol % | — | — | 5 | — | — | — |
| Proportion of total production in R1 | % | 100 | 55 | 40 | 10 | 66 | 50 |
| Proportion of total production in R2 | % | — | 45 | 30 | 90 | 34 | 50 |
| Proportion of total production in R3 | % | — | — | 30 | — | — | — |
| Specific yield | t/m³ | 0.27 | 0.38 | 0.44 | 0.33 | 0.34 | 0.41 |
| Ratio a1/[(a2r2 − a1r1)/(r2 − r1)] | | ref | 1.3 | 1.3 | 1.1 | 2.4 | 0.9 |
| Productivity/unit ethylene in R1 | g/g/mol % | 5200 | 5500 | 4267 | 1400 | 6000 | 5161 |
| Productivity/unit ethylene in $R_{final}$ | g/g/mol % | — | 2250 | 1920 | 5040 | 1659 | 2867 |
| Total productivity (kg/kg catalyst) | g/g | 26000 | 30000 | 32000 | 28000 | 20000 | 25800 |

ZN* assumes 5-50 ppmwt of triethylaluminium (TEA) cocatalyst added to first reactor R1 only
ZN** assumes 5-50 ppmwt of triethylaluminium (TEA) cocatalyst added in total to both reactors, split between the reactors in a ratio of 20:80-80:20

The above Examples use a reactor system having a moderately deactivating activity profile (the ratio a1/[(a2r2−a1r1)/(r2−r1)] is significantly higher than in Table 1), but still within the range covered by the invention. In this case, the increase in total productivity for Examples B2-B4 compared with Example B1 is still significant, but less than for Examples A2-A4.

Examples B5 and B6 show the effect of adding triethyl aluminium (TEA) cocatalyst. The addition of TEA to a Ziegler-Natta catalysed ethylene polymerisation is known to increase productivity. As in the case of chromium catalyst and triethyl boron cocatalyst, if TEA is added only to the first reactor the difference in productivity per unit ethylene between reactor 1 and reactor 2 is very high, and the overall activity profile is highly deactivating and outside the scope of the invention. However if the same amount of TEA is instead split equally between the two reactors, the productivity per unit ethylene of the two reactors is much more similar, resulting in a much less deactivating profile. The overall productivity is also increased.

In Table 3 below, Examples A1 to A4 are replicated but based on data obtained using a metallocene catalyst.

TABLE 3

| | | metallocene catalyst (comparative) | | | |
|---|---|---|---|---|---|
| EXAMPLES | | C1 | C2 | C3 | C4 |
| Catalyst | | Met | Met | Met | Met |
| Number of reactors | | 1 | 2 | 3 | 2 |
| Diluent | | isob | isob | isob | isob |
| Total reactor volume | m³ | 200 | 200 | 200 | 200 |
| Vol R1 | m³ | 200 | 100 | 67 | 5 |
| Vol R2 | m³ | — | 100 | 67 | 195 |
| Vol R3 | m³ | — | — | 67 | — |
| Total production rate | t/hr | 40 | 40 | 40 | 40 |
| Total space time yield | t/hr · m³ | 0.20 | 0.20 | 0.20 | 0.20 |
| Solids concentration | wt % | 45 | 45 | 45 | 45 |
| Total residence time | Hr | 1.35 | 1.90 | 2.25 | 1.65 |
| Residence time in R1 | Hr | 1.35 | 1.23 | 1.12 | 0.34 |
| Residence time in R2 | Hr | — | 0.68 | 0.67 | 1.32 |
| Residence time in R3 | Hr | — | — | 0.45 | — |
| Ethylene concentration in R1 | mol % | 5 | 2 | 2 | 1.5 |
| Ethylene concentration in R2 | mol % | — | 8 | 5 | 8 |
| Ethylene concentration in R3 | mol % | — | — | 8 | — |
| Proportion of total production in R1 | % | 100 | 55 | 40 | 10 |
| Proportion of total production in R2 | % | — | 45 | 27 | 90 |
| Proportion of total production in R3 | % | — | — | 33 | — |
| Specific yield | t/m³ | 0.27 | 0.38 | 0.45 | 0.33 |
| Ratio a1/[(a2r2 − a1r1)/(r2 − r1)] | | ref | 2.7 | 2.9 | 2.3 |
| Productivity/unit ethylene in R1 | g/g/mol % C2 | 1300 | 1815 | 1360 | 447 |
| Productivity/unit ethylene in $R_{final}$ | g/g/mol % C2 | — | 371 | 281 | 754 |
| Total productivity (kg/kg catalyst) | g/g | 6500 | 6600 | 6800 | 6700 |

The above examples all have activity profiles which are outside the claim, as shown by the ratio a1/[(a2r2−a1r1)/(r2−r1)] which is above 1.7. Examples C2, C3 and C4 can be compared directly with the corresponding Examples in Tables 1 and 2, since conditions have been adjusted in the same way. It can be seen that in this case the benefit, as measured by the increase in overall productivity, is much less. This is because the catalyst system is not sufficiently activating to be able to benefit from the invention.

The invention claimed is:
1. Slurry process comprising polymerizing ethylene in a reactor system comprising one or more reactors in series, having an average polymerisation productivity [kgPE/kg-cata] per unit ethylene per hour a1 during operation at any first residence time r1 which is less than 1.7 (a2r2−a1r1)/(r2−r1), where a2 is the average polymerisation productivity [kgPE/kgcata] per unit ethylene per hour during operation at any second residence time r2 where r2>r1, r2 and the value a2r2 being determined either in the same reactor in the case of a single reactor polymerisation, or in a reactor subsequent to the reactor in which a1 and r1 are measured in the case where the polymerisation takes place in more than one reactor, the residence time r2 and value a2r2 in this latter case corresponding to the total residence time and productivity respectively of both reactors; and
  wherein the specific yield of the reactor system is greater than 0.3 tonnes/m³, specific yield being the production rate of the final reactor (t/h) in the reactor system divided by the total volume of all the reactors in the reactor system ($m^3$) multiplied by the total residence time in all the reactors in the reactor system (h).

2. Process according to claim 1, wherein $a1<1.3[(a2r2-a1r1)/(r2-r1)]$.

3. Process according to claim 1, wherein the catalyst used in the polymerisation reaction is a chromium catalyst.

4. Process according to claim 3, wherein $a1<[(a2r2-a1r1)/(r2-r1)]$.

5. Process according to claim 1 wherein the catalyst used in the polymerisation reaction is a Ziegler-Natta catalyst.

6. Process according to claim 5, wherein $a1<1.3[(a2r2-a1r1)/(r2-r1)]$.

7. Process according to claim 1, wherein the specific yield of the reactor system is greater than 0.33 tonnes/$m^3$.

8. Process according to claim 1, wherein the specific yield of the reactor system is greater than 0.37 tonnes/$m^3$.

9. Process according to claim 1, which is carried out in a single reactor having a solids concentration of at least 55 wt %.

10. Process according to claim 1, which is carried out in two or more reactors in series, wherein each reactor has a solids concentration of at least 35 wt % and each reactor comprises 15-70% of the total reactor volume.

11. Process according to claim 10, which is carried out in two reactors in series, each of which comprises 40-60% of the total reactor volume, and each of which contributes 40-60% of the total production.

12. Process according to claim 10, which is carried out in three reactors in series, each of which comprises 20-60% of the total reactor volume, and each of which contributes 20-60% of the total production.

13. Process according to claim 1, in which a prepolymerisation reaction is carried out in a first reactor followed by polymerisation in at least one main reactor having a solids concentration of at least 44 wt %, wherein the volume of the prepolymerisation reactor is at least 5% of that of the main reactor.

14. Process according claim 1, in which at least one reactor has a solids concentration of at least 48 wt %.

15. Process according to claim 14, wherein diluent in the reactor has a solids concentration of at least 48 wt % and a density of 400 kg/$m^3$ or less.

16. Process according to claim 10, in which a low molecular weight (LMW) polymer is made in one reactor, and a high molecular weight (HMW) polymer is made in another reactor, the polymers being made in either order and the second polymer being made in the presence of the first.

17. Process according to claim 11, in which a low molecular weight (LMW) polymer is made in one reactor, and a high molecular weight (HMW) polymer is made in another reactor, the polymers being made in either order and the second polymer being made in the presence of the first.

18. Process according to claim 12, in which a low molecular weight (LMW) polymer is made in one reactor, and a high molecular weight (HMW) polymer is made in another reactor, the polymers being made in either order and the second polymer being made in the presence of the first.

* * * * *